US007146935B1

(12) United States Patent
Donnelly

(10) Patent No.: US 7,146,935 B1
(45) Date of Patent: Dec. 12, 2006

(54) ANIMAL TRAINING METHOD

(75) Inventor: Melinda Donnelly, Claremont (CA)

(73) Assignee: Flexmaster Canada Ltd. (CA)

( * ) Notice: Subject to any disclaimer, the term of this patent is extended or adjusted under 35 U.S.C. 154(b) by 0 days.

(21) Appl. No.: 11/231,324

(22) Filed: Sep. 20, 2005

(51) Int. Cl.
*A01K 37/00* (2006.01)

(52) U.S. Cl. .................... 119/712; 119/905; 119/422; 119/452; 119/743; 119/482; 119/702

(58) Field of Classification Search ........... 119/421, 119/416, 422, 453, 455, 486, 496, 667, 669, 119/743, 452, 472, 473, 482, 474, 712, 905, 119/622, 702–707
See application file for complete search history.

(56) References Cited

U.S. PATENT DOCUMENTS

| | | | | |
|---|---|---|---|---|
| 3,742,908 | A * | 7/1973 | Merino | 119/455 |
| 5,230,304 | A * | 7/1993 | Santoro | 119/751 |
| 5,664,524 | A * | 9/1997 | Piglia et al. | 119/452 |
| 5,755,183 | A * | 5/1998 | Udelle et al. | 119/622 |
| 6,109,213 | A * | 8/2000 | Rebalko | 119/422 |
| 6,668,757 | B1 * | 12/2003 | Marchioro | 119/452 |
| 2003/0136351 | A1 * | 7/2003 | Morgan | 119/484 |
| 2004/0025801 | A1 * | 2/2004 | Cheshire | 119/472 |

FOREIGN PATENT DOCUMENTS

GB    2274572 A   *   8/1994

OTHER PUBLICATIONS

DOGTUBE.com Our clear Dogtube-Features, www.dogtube.com/cleardogtube.htm [retrieved from internet Jul. 20, 2006] Jun. 5, 2002, 1 page.*
DOG TUBE.com, [retrieved from internet Jul. 26, 2006], 1 page.*
Agility Dog Association of Australia Ltd, Tunnels, http://adaa.com.au/shop/tunnels.htm [retrieved from internet Jul. 26, 2006] Jan. 21, 2004, 3 pages.*
A Race Rack in the Garden Dog Obstacle Course & Race Track Outdoor, Tunnel, www.seefido.com/html/dog_obstacle_course_race_tra.htm [retrieved from internet Jul. 20, 2006] 2 pages and Way back Machine print out 1 page.*

* cited by examiner

*Primary Examiner*—Andrea M. Valenti
(74) *Attorney, Agent, or Firm*—Bourque and Associates

(57) ABSTRACT

A method for training an animal to proceed through an enclosure begins with the act of providing a generally clear or translucent enclosure having a first end, which serves as an entrance and a second end, which serves as an exit. A trainer encourages the animal to enter the entrance and can walk alongside the enclosure allowing the animal to generally observe the trainer to reduce any apprehension and to generally encourage the animal to proceed through the enclosure. Subsequently, the clear or translucent enclosure is replaced with an opaque enclosure once the animal has gained sufficient experience and comfort with the clear and/or translucent enclosure.

2 Claims, 1 Drawing Sheet

ANIMAL TRAINING METHOD

TECHNICAL FIELD

The present invention relates to animal training and more specifically, to a method for training an animal, such as a dog, to enter and traverse through a closed container or environment, such as a tube.

BACKGROUND INFORMATION

Many animal and pet owners enjoy training their animals to perform various agility maneuvers. Examples of these agility maneuvers include climbing ladders, jumping over hurdles and running through tubes.

Some of the training for these agility maneuvers involves simply teaching the animal how to perform the maneuver by having the animal complete the maneuver time and time again. This training methodology works for those maneuvers which an animal can initially accomplish on its own but for which additional training will result in better performance or quicker timeframes. For other maneuvers, however, such as running through tubes, many animals are not instinctively able to do such a maneuver. In many instances, in fact, animals are reluctant to enter into a small opening formed by a darkened tube. Accordingly, the animal's owner or trainer must teach the animal with a method that allows the animal to learn that such a maneuver is not dangerous or inherently intimidating.

Accordingly, what is needed is an animal training method which facilitates and enables the training of an animal to ultimately enter into a small opening of a darkened and confined area such as a tube, box or the like.

SUMMARY

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

The present invention features a method for training an animal, such as a dog, to perform an agility maneuver such as often performed during dog trials when dogs and other animals are asked to race around a course doing agility maneuvers such as jumping over hurdles, climbing ladders and running through tunnels or tubes.

The present invention focuses on training an animal to be able to enter and exit an enclosure such as a tube or tunnel. In many instances, during competition, such tubes or enclosures are required to be darkened or opaque such that the animal cannot observe anything on the outside or see any shadows.

Accordingly, in order to train an animal who would otherwise be apprehensive in entering in such a darkened enclosure, the present invention features a method which begins by providing an enclosure which is clear or translucent such that the animal can either see it's owner or trainer or least see the shadow or presence of the owner or trainer outside of the enclosure. The animal is led to the enclosure entrance and taught to walk or run through the enclosure to the exit.

Various methods may be used to train the animal to do this maneuver including using some method to entice the animal to enter and traverse the enclosure, such as providing a treat or snack at the end of the enclosure or the like. Because the enclosure is clear or at least translucent, the animal sees it's owner or trainer and thus, any fears or apprehension in entering the enclosure is eliminated or at least minimized.

Training with the clear or translucent tube continues until the animal is very comfortable with this maneuver with the clear or translucent tube. Next, the method of the present invention features the act of replacing the clear or translucent tube with a darkened or generally non-translucent tube such as the type used and required in competitions. Having been exposed to and become comfortable with the clear or translucent tube, the animal may now be taught to traverse the darkened tube without the normal fear or apprehension which exists in the prior art when trying to teach an animal to enter a tube by beginning with the darkened tube.

In an alternative embodiment, one or more additional enclosure types may be utilized. In this embodiment, the method of the present invention may include after the act of utilizing and training an animal to go through the clear or translucent enclosure, providing a semi-translucent or semi-opaque enclosure which provides the animal with a bright interior region of the enclosure that is not as darkened as a darkened enclosure utilized for actual competitions but not clear thereby not allowing the animal to actually see the owner or trainer. This intermediary step allows an animal that is otherwise reluctant to go from the clear or translucent enclosure to the darkened enclosure to transition more easily.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
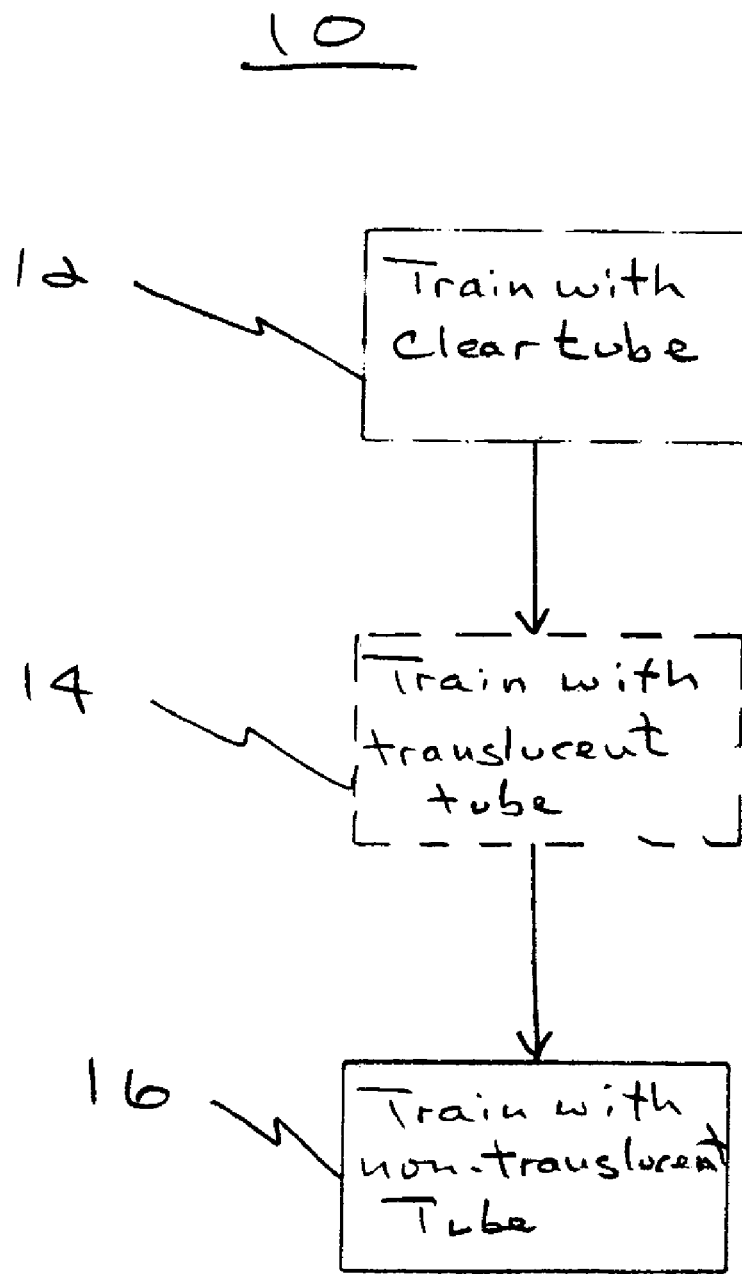
FIG. 1 is flow chart of the method according to the present invention.

The present invention features a method for training and animal, such as a dog, to enter and traverse through a darkened or generally opaque environment in which the end or exit cannot be seen, such as a tube. During sanctioned competitions, animals, such as dogs, must run through darkened or at least opaque tubes. Typically, these tubes are not "straight" but rather, are provided with bends and curves. The animal can therefore not see the end of the tube or tunnel, making it even more apprehensive. Since many animals are inherently reluctant to enter darkened or confined areas, it is important for this type of training to introduce the animal to this concept gradually.

Accordingly, the method 10, FIG. 1, according to the present invention begins by first training an animal with a generally clear or translucent tube, steps 12 or 14. Such tubes are typically approximately 24 inches in diameter and made of a durable PVC coated fabric or similar material. The tubes may resemble heating ducts which are flexible and include a spiral metal band to help support the fabric. Using such a clear tube, an otherwise apprehensive animal can see it's surroundings including its master or trainer. Using this method, the master or trainer can entice or lure the animal into and through the tube. An exemplary clear training tube is available from www.dogtube.com.

Once the animal is comfortable with entering and traversing the clear or translucent tube, the method of the present invention next proceeds to step 14 or 16 (depending on which step the method began with) wherein the animal is introduced to either a translucent tube (step 14) or a non-translucent (opaque; semi-opaque or darkened) tube (step 16). In one embodiment, the animal may gradually be introduced to a darkened tube by utilizing a translucent or partially translucent tube, step 14. In this embodiment, this step, which is optional, may include providing a tube with a lightly colored fabric which gives the animal a sense of openness but does not allow the animal to completely see or observe it's surroundings. An example of a fabric would be a light yellow colored fabric. Such a fabric would provide a lightened interior region of the tube but prevent the animal from seeing its trainer or owner.

Lastly, the present invention introduces the animal to a non-translucent or much more darkened tube, step 16. Examples of tubes which could be utilized in this step are constructed from the same type of material as the clear or translucent tube but are colored much darker such as dark red, dark brown or black.

Accordingly, utilizing the methodology of the present invention, an animal can be trained for either competition purposes or, in other instances, for other purposes including, but not limited to, search and rescue, cadaver searching, missing person searching, drug searching or explosive searching.

As mentioned above, the present invention is not intended to be limited to a system or method which must satisfy one or more of any stated or implied object or feature of the invention and should not be limited to the preferred, exemplary, or primary embodiment(s) described herein. Modifications and substitutions by one of ordinary skill in the art are considered to be within the scope of the present invention, which is not to be limited except by the allowed claims and their equivalents.

The invention claimed is:

1. An animal training method comprising, in succession, the acts of:

providing a generally clear enclosure having first and second ends and an enclosed region between said first and second ends, said first end providing an entrance and said second end providing an exit, said generally clear enclosure allowing said animal to generally observe or recognize an animal trainer located adjacent said generally clear enclosure while in said enclosed region;

training said animal to enter said first entrance of said generally clear enclosure and exit said exit of said generally clear enclosure while said trainer walks outside along side the said generally clear enclosure and is generally observed by said animal;

providing a generally translucent enclosure having first and second ends and an enclosed region between said first and second ends, said first end providing an entrance and said second end providing an exit;

training said animal to enter said first entrance of said generally translucent enclosure and exit said exit of said generally translucent enclosure;

providing a generally opaque enclosure having first and second ends and an enclosed region between said first and second ends, said first end providing an entrance and said second end providing an exit, said opaque enclosure generally preventing said animal from observing or recognizing an animal trainer located adjacent said opaque enclosure while in said enclosed region; and training said animal to enter said first entrance of said opaque enclosure and exit said exit of said opaque enclosure; wherein said clear enclosure, said translucent enclosure, and said opaque enclosure are tubes.

2. The method of claim 1 wherein said tubes are selected from the group consisting of fabric, coated fabric or all plastic extruded film covered flexible tube including a spiral wire support.

* * * * *